US012756454B2

(12) United States Patent
Liu et al.

(10) Patent No.: US 12,756,454 B2
(45) Date of Patent: Oct. 6, 2026

(54) INITIAL ACCESS FOR MESSAGE RELAYING USING AIR-TO- GROUND CONNECTIONS

(71) Applicant: QUALCOMM Incorporated, San Diego, CA (US)

(72) Inventors: Kangqi Liu, San Diego, CA (US); Qiaoyu Li, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/701,189

(22) PCT Filed: Dec. 21, 2021

(86) PCT No.: PCT/CN2021/139893
§ 371 (c)(1),
(2) Date: Apr. 12, 2024

(87) PCT Pub. No.: WO2023/115297
PCT Pub. Date: Jun. 29, 2023

(65) Prior Publication Data
US 2024/0405849 A1 Dec. 5, 2024

(51) Int. Cl.
*H04B 7/185* (2006.01)
*H04W 76/27* (2018.01)

(52) U.S. Cl.
CPC ........ *H04B 7/18506* (2013.01); *H04W 76/27* (2018.02)

(58) Field of Classification Search
CPC ....... H04W 4/42; H04W 76/27; H04W 92/18; H04B 7/185
See application file for complete search history.

(56) References Cited

U.S. PATENT DOCUMENTS 8,868,069 B2 * 10/2014 Bennett .............. H04B 7/18506 370/335
2013/0324070 A1 12/2013 Bennett et al.
2021/0068028 A1 * 3/2021 Wei ..................... H04W 36/322

FOREIGN PATENT DOCUMENTS

CN 108234013 A 6/2018
WO 2021159726 A1 8/2021

OTHER PUBLICATIONS

CMCC: "Discussion on Implicit Compatibility to Support ATG Scenarios in NTN", 3GPP TSG RAN WG1 #102-e, R1-2006213, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 28, 2020, XP051915252, pp. 1-9.
International Search Report and Written Opinion—PCT/CN2021/139893—ISA/EPO—Aug. 1, 2022.

* cited by examiner

*Primary Examiner* — Tuan H Nguyen
(74) *Attorney, Agent, or Firm* — Polsinelli

(57) ABSTRACT

Disclosed are systems and techniques for performing wireless communication. In some aspects, a method performed at a user equipment (UE) may include obtaining configuration information for communicating with one or more aircrafts. In some examples, the method can include generating a message based at least in part on the configuration information. In some cases, the method can include outputting the message for transmission to at least one aircraft of the one or more aircrafts.

30 Claims, 11 Drawing Sheets

INITIAL ACCESS FOR MESSAGE RELAYING USING AIR-TO- GROUND CONNECTIONS

CROSS-REFERENCE TO RELATED APPLICATIONS

This application for Patent is a 371 of international Patent Application PCT/CN2021/139893, filed Dec. 21, 2021, which is hereby incorporated by referenced in its entirety and for all purposes.

FIELD OF THE DISCLOSURE

Aspects of the present disclosure generally relate to wireless communication. In some implementations, examples are described for performing wireless communications using air-to-ground connections.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

Air-to-ground (ATG) communications systems are deployed to provide various telecommunication services associated with aircrafts. ATG communications systems can be implemented to interface with terrestrial wireless communications systems by positioning terrestrial antennas (e.g., at a base station) in a manner that can communicate with aircraft antennas while the aircraft is in flight. In some cases, ATG communications can be used to provide in-flight communication services for airborne devices. In addition, ATG communications can be used to provide airline operations communications (e.g., aircraft maintenance, flight planning, weather, etc.) as well as air traffic control information.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method for wireless communications performed at a user equipment (UE) is provided. The method may include: obtaining configuration information for communicating with one or more aircrafts: generating a message based at least in part on the configuration information; and outputting the message for transmission to at least one aircraft of the one or more aircrafts.

In another example, an apparatus for wireless communications is provided that includes at least one memory comprising instructions and at least one processor (e.g., configured in circuitry) configured to execute the instructions and cause the apparatus to: obtain configuration information for communicating with one or more aircrafts: generate a message based at least in part on the configuration information; and output the message for transmission to at least one aircraft of the one or more aircrafts.

In another example, a non-transitory computer-readable medium is provided that includes stored thereon at least one instruction that, when executed by one or more processors, may cause the one or more processors to: obtain configuration information for communicating with one or more aircrafts: generate a message based at least in part on the configuration information; and output the message for transmission to at least one aircraft of the one or more aircrafts.

In another example, an apparatus for wireless communication is provided. The apparatus may include: means for obtaining configuration information for communicating with one or more aircrafts: means for generating a message based at least in part on the configuration information; and means for outputting the message for transmission to at least one aircraft of the one or more aircrafts.

In another example, a method for wireless communications performed at an aircraft is provided. The method may include: obtaining at least one message from a terrestrial user equipment (UE); and outputting data associated with the at least one message for transmission to a base station.

In another example, an apparatus for wireless communications is provided that includes at least one memory comprising instructions and at least one processor (e.g., configured in circuitry) configured to execute the instructions and cause the apparatus to: obtain at least one message from a terrestrial user equipment (UE); and output data associated with the at least one message for transmission to a base station.

In another example, a non-transitory computer-readable medium is provided that includes stored thereon at least one instruction that, when executed by one or more processors, may cause the one or more processors to: obtain at least one message from a terrestrial user equipment (UE); and output data associated with the at least one message for transmission to a base station.

In another example, an apparatus for wireless communication is provided. The apparatus may include: means for obtaining at least one message from a terrestrial user equipment (UE); and means for outputting data associated with the at least one message for transmission to a base station.

In another example, a method for wireless communications performed by a network entity is provided. The method may include: obtaining one or more measurements associated with a user equipment (UE): identifying, based on the one or more measurements, at least one aircraft configured to communicate with the UE; and outputting configuration information associated with the at least one aircraft for transmission to the UE.

In another example, a network entity for wireless communications is provided that includes at least one memory, at least one transceiver, and at least one processor (e.g., configured in circuitry) communicatively coupled to the at least one memory and the at least one transceiver. The at least one processor may be configured to: obtain one or more measurements associated with a user equipment (UE): identify, based on the one or more measurements, at least one aircraft configured to communicate with the UE; and output configuration information associated with the at least one aircraft for transmission to the UE.

In another example, a non-transitory computer-readable medium of a wireless communication device is provided that includes stored thereon at least one instruction that, when executed by one or more processors, may cause the one or more processors to: obtain one or more measurements associated with a user equipment (UE): identify, based on the one or more measurements, at least one aircraft configured to communicate with the UE; and output configuration information associated with the at least one aircraft for transmission to the UE.

In another example, an apparatus for wireless communication is provided. The apparatus may include: means for obtaining one or more measurements associated with a user equipment (UE): means for identifying, based on the one or more measurements, at least one aircraft configured to communicate with the UE; and means for outputting configuration information associated with the at least one aircraft for transmission to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
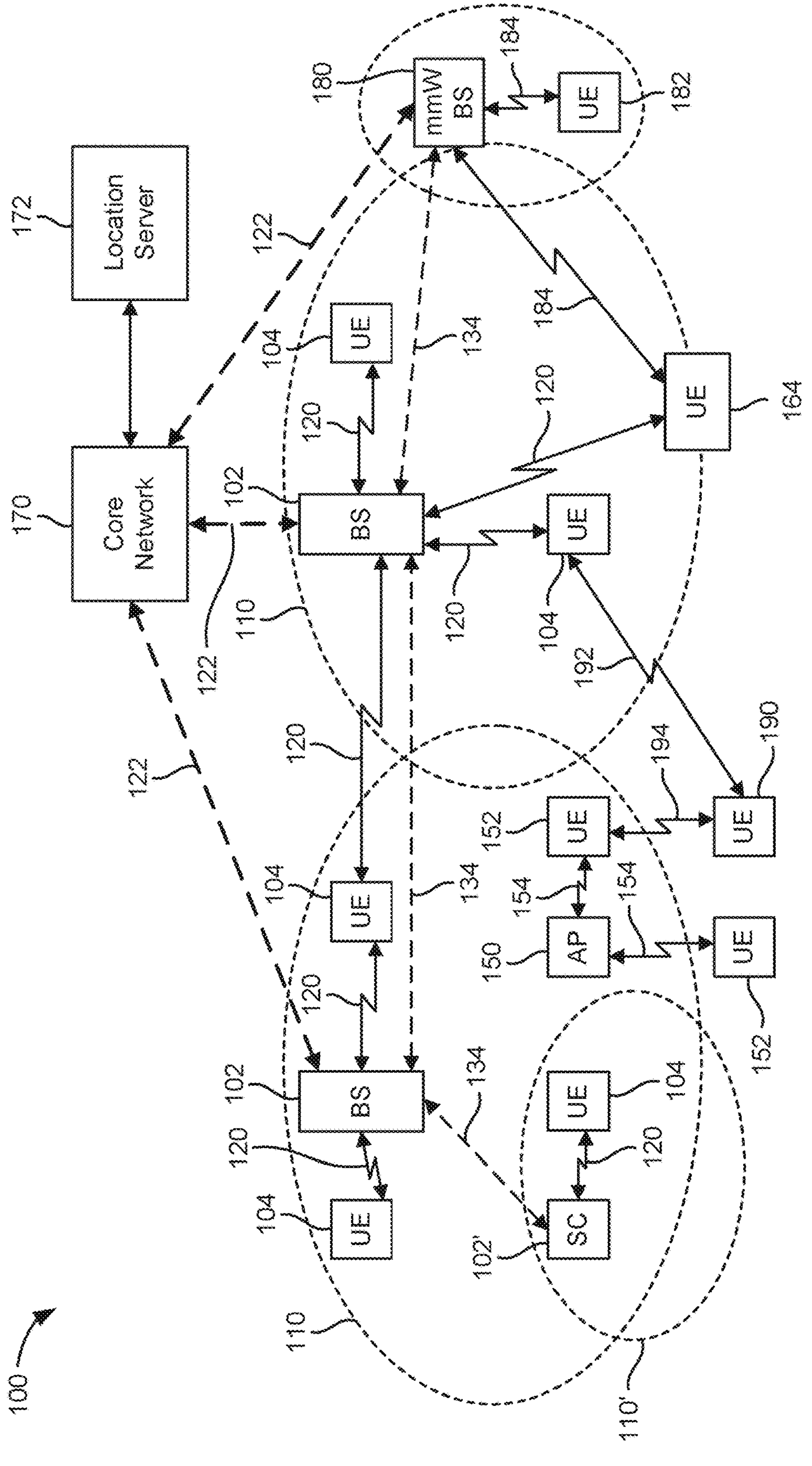
FIG. 1 illustrates an exemplary wireless communications system, according to aspects of the disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless s communication networks are deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In some cases, a client device may be outside of the coverage area associated with a wireless communication network. For example, a client device may be located in a geographical area that is outside the range of the nearest base station or in a geographical area with poor signal quality. In such cases, access to a wireless communication network may be possible by using satellite communications. However, communication with existing satellite systems (e.g., Iridium® satellites) is not practical. For example, communication with existing satellite systems may require the use of specialized client devices that satisfy strict antenna and transmit power requirements. In some cases, use of such specialized client devices requires skillful human-assisted operation for antenna positioning in a manner that avoids interference. While the shortcomings of existing satellite systems may be addressed by 3GPP non-terrestrial networks (NTN), such networks are associated with very high deployment costs (e.g., launching of new satellites), which may delay or hinder implementation.

Air-to-ground (ATG) communications can be used to provide connectivity between terrestrial wireless communication networks and aircrafts. As used herein, an aircraft can include any apparatus or device that is configured to or able to fly through the air, such as an airplane (e.g., commercial airplanes, private airplanes, turboprop aircrafts, piston aircrafts, jets, military aircrafts, etc.), an unmanned aerial vehicle (UAE) or drone, a helicopter, an airship (e.g., a blimp or other airship), a glider, or other apparatus or device that is configured to or able to fly. For example, ATG communications can be implemented by positioning an antenna on a base station in an upward direction (e.g., antenna up-tilting) to facilitate communication with an airborne aircraft having an antenna on the bottom and/or side. ATG communications can be used to provide in-flight passenger communication services, airline operation communications, and air traffic control services, among others. Advantages of ATG communications over satellite communications include lower cost, higher throughput, and lower latency.

Systems, apparatuses, processes (also referred to as methods), and computer-readable media (collectively referred to as "systems and techniques") are described herein for performing wireless communications using air-to-ground (ATG) connections. The systems and techniques provide the ability for client devices (e.g., UEs) to perform wireless communications while outside the coverage area of a base station by utilizing air-to-ground connections. In some aspects, commercial aircrafts can be used as relays to extend network coverage to areas that are not covered by a terrestrial base station. For example, the typical cruising altitude (e.g., 10 kilometers (km)) that is used by commercial aircrafts allows for line-of-sight (LoS) propagation of wireless signals for over 200 km. In addition, while the density of aircraft traffic may vary depending on the geographic region, aircraft traffic in most areas typically includes at least one aircraft that is within a 50-100 km range of a client device and/or a base station.

According to some aspects, a client device may be configured to perform ATG communications. For example, a client device that is outside the coverage area of a terrestrial network may transmit one or more messages to an aircraft that is configured to relay the transmission to a terrestrial base station. In some examples, the client device may receive aircraft configuration information that can be used to communicate with one or more aircrafts. In some aspects, the one or more aircrafts do not actively transmit any signals (e.g., synchronization signal block (SSB) with beam sweeping) that can be used by a client device for discovery of the one or more aircrafts. In such aspects, a base station can provide the aircraft configuration information to the client device. In some examples, interference towards terrestrial systems can be avoided and/or minimized by reducing the signals that are transmitted by the aircrafts (e.g., based on the one or more aircrafts not actively transmitting signals for use by a client device for discovery of the aircraft(s)).

In some cases, the aircraft configuration information is provided to the client device (e.g., by a base station or other network entity) based on a determination of a movement and/or a prospective location that will result in the client device being outside of network coverage. In some aspects, the aircraft configuration information can be provided to the client device (e.g., by a base station or other network entity) using radio resource control (RRC) signaling. For example, a base station or other network entity can provide the configuration information to the client device in the radio access network-based notification area (RNA) using one or more information elements (IEs). In some examples, the configuration information can include resource information for a random-access channel (RACH) preamble (e.g., frequency domain and/or time domain resource information), a RACH preamble format, an aircraft route, an aircraft flight time, a timing advance (TA) parameter, an inactive radio network temporary identifier (I-RNTI) parameter, and/or data related to discovery signals transmitted by an aircraft.

In some cases, the aircraft configuration information can be provided to the client device using an application layer protocol. For example, the client device can receive the aircraft configuration information from a location server (e.g., an Aircraft Information Management Server). In some aspects, the client device can use the aircraft configuration information to transmit a small data transmission (SDT), a random-access channel (RACH) preamble message, and/or a scheduled uplink transmission to the aircraft. In some cases, the client device may transmit an SOS message to the aircraft. In some examples, transmissions from the client device to the aircraft can be relayed to a terrestrial base station by the aircraft. In some examples, the aircraft may be identified as a base station or as an integrated access and backhaul (IAB) node.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on. In some examples, UEs may communicate with a RAN and/or with the core network by using air-to-ground connections (e.g., a UE may communicate with an aircraft that is configured as a base station, an aircraft UE, a wireless relay device, an integrated access and backhaul (IAB) node, etc.).

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHZ unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHZ). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
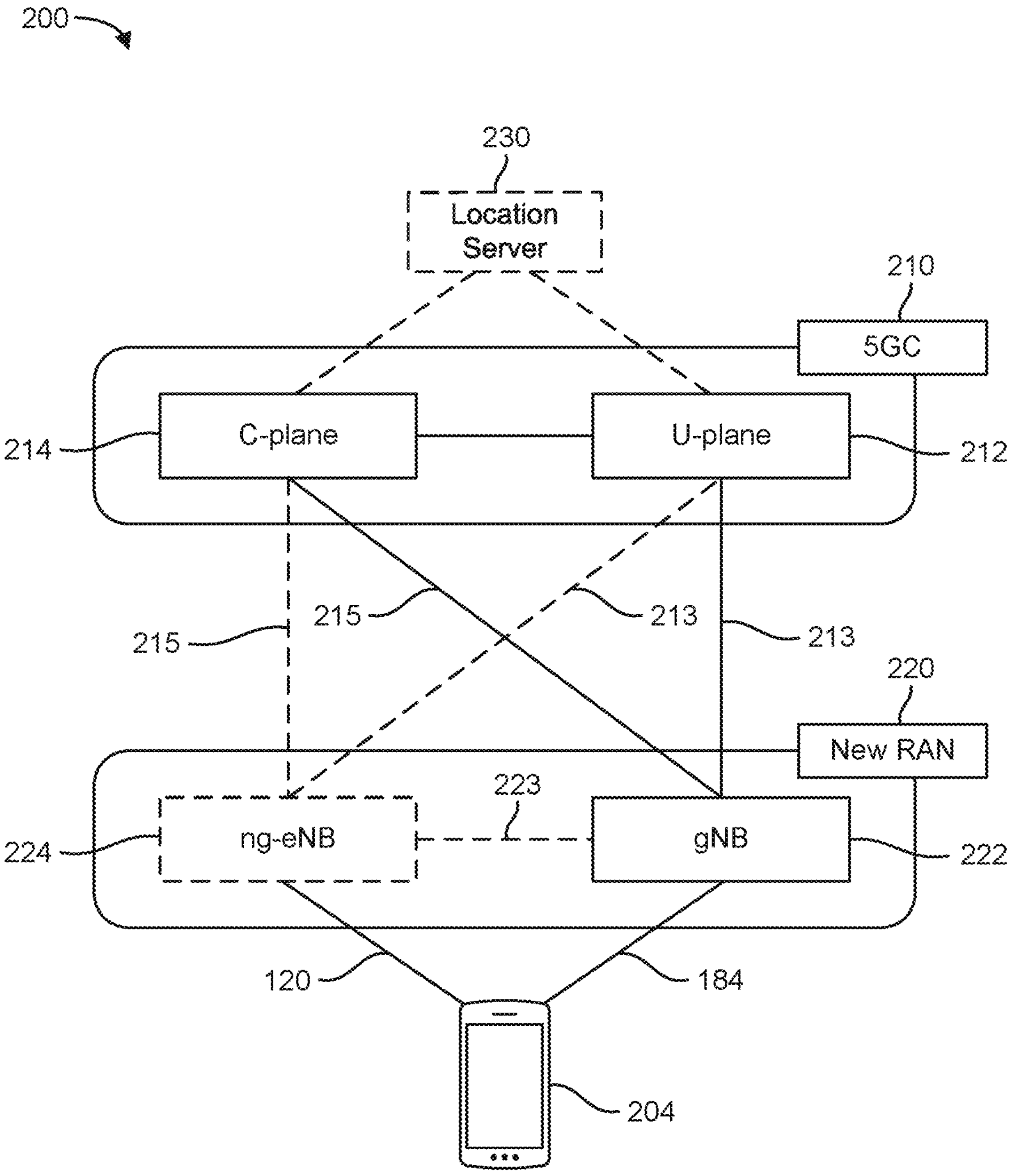
FIG. 2A and FIG. 2B illustrate examples of wireless network structures, according to aspects of the disclosure.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server. The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

In some examples, the location server 230 may include and/or communicate with an Aircraft Information Management Server (AIMS). In some cases, the AIMS can provide aircraft information to UEs 204. In some instances, the aircraft information can include resource information for random-access channel (RACH) preamble information, RACH preamble format information, aircraft route information, aircraft flight time information, timing advance (TA) parameter(s), inactive radio network temporary identifier (I-RNTI) parameter(s), any other information, and/or any combination thereof.

Figure 2B:
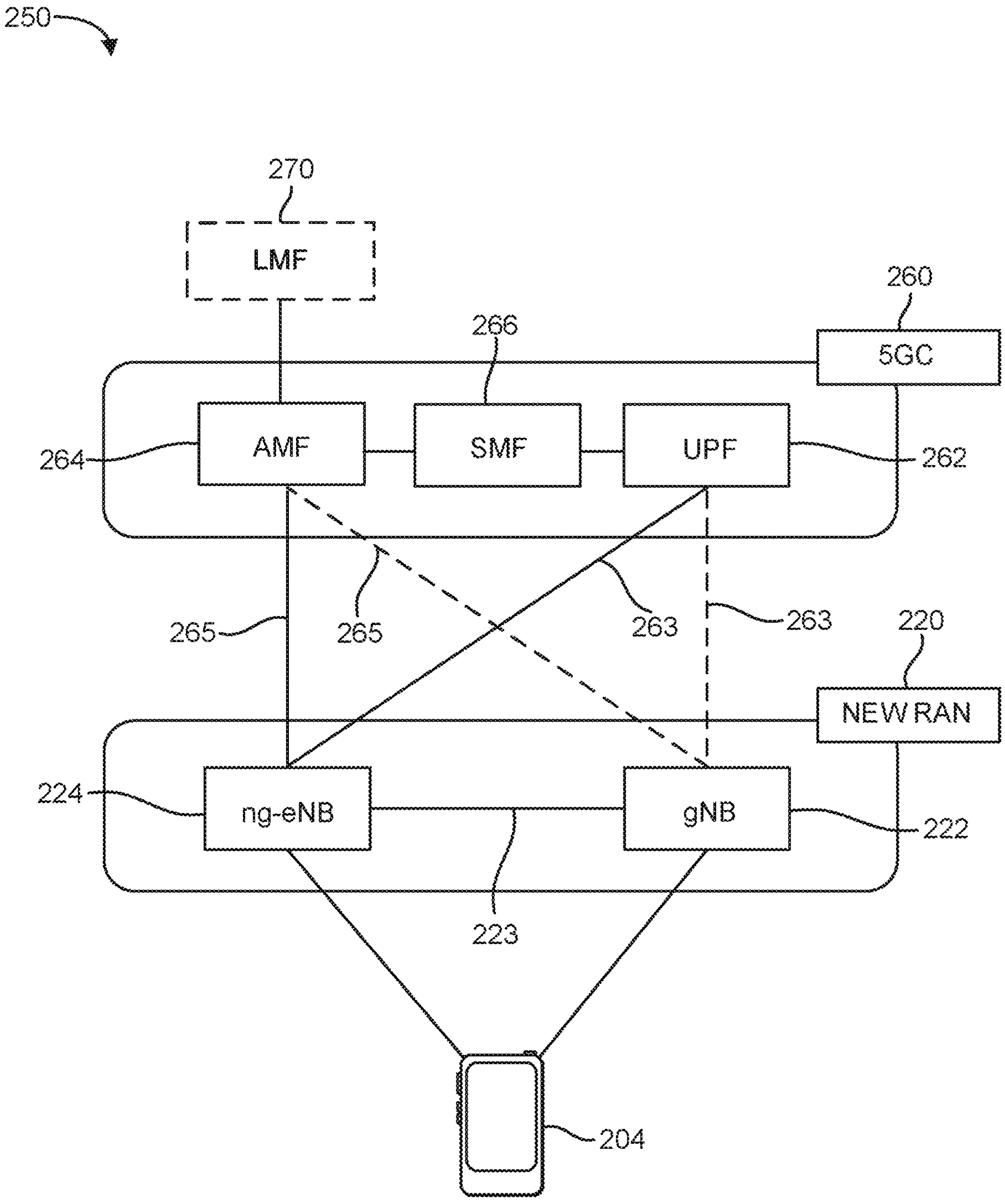

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). In some aspects, the functions of the AMF 264 may also include Aircraft Information Management Function (AIMF). In some configurations, AIMF may be implemented as a separate network function that is part of wireless network structure 250) and can interact with AMF 264. In some examples, AIMF can be used to implement air-to-ground (ATG) connections between UE 204 and one or more aircrafts. In some cases, the AMF 264 may also interact with an authentication server function (AUSF) (not shown) and the UE 204, and may receive an intermediate key established as a result of the UE 204 authentication process.

In the case of authentication based on a UMTS (universal mobile telecommunications system) subscriber identity module (USIM), the AMF 264 may retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B)

over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

Figure 3:
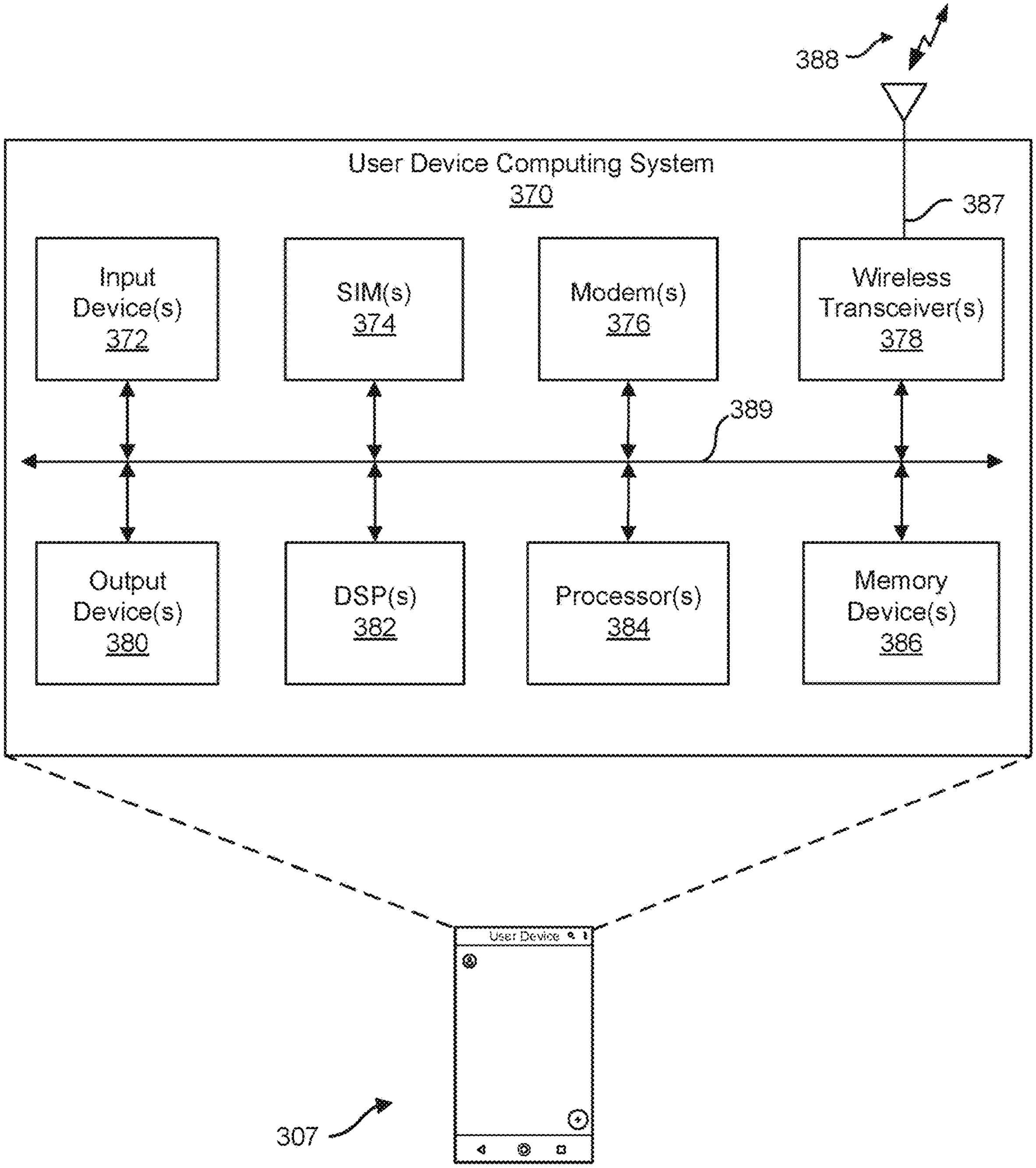
FIG. 3 is a block diagram illustrating an example of a computing system of a user device, according to aspects of the disclosure.

FIG. 3 illustrates an example of a computing system 370 of a wireless device 307. The wireless device 307 may include a client device such as a UE (e.g., UE 104, UE 152, UE 190) or other type of device (e.g., a station (STA) configured to communication using a Wi-Fi interface) that may be used by an end-user. Wireless device may also include network devices (e.g., base stations such as eNBs and/or gNBs, Wi-Fi access points (APs) such as routers, range extenders or the like, etc.). For example, the wireless device 307 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 370 includes software and hardware components that may be electrically or communicatively coupled via a bus 389 (or may otherwise be in communication, as appropriate). For example, the computing system 370 includes one or more processors 384. The one or more processors 384 may include one or more CPUs, ASICS, FPGAS, APs, GPUs, VPUs, NSPs, microcontrollers, dedicated hardware, any combination thereof, and/or other processing device or system. The bus 389 may be used by the one or more processors 384 to communicate between cores and/or with the one or more memory devices 386.

The computing system 370 may also include one or more memory devices 386, one or more digital signal processors (DSPs) 382, one or more SIMs 374, one or more modems 376, one or more wireless transceivers 378, an antenna 387, one or more input devices 372 (e.g., a camera, a mouse, a keyboard, a touch sensitive screen, a touch pad, a keypad, a microphone, and/or the like), and one or more output devices 380 (e.g., a display, a speaker, a printer, and/or the like).

In some aspects, computing system 370 may include one or more radio frequency (RF) interfaces configured to transmit and/or receive RF signals. In some examples, an RF interface may include components such as modem(s) 376, wireless transceiver(s) 378, and/or antennas 387. The one or more wireless transceivers 378 may transmit and receive wireless signals (e.g., signal 388) via antenna 387 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 370 may include multiple antennas or an antenna array that may facilitate simultaneous transmit and receive functionality. Antenna 387 may be an omnidirectional antenna such that radio frequency (RF) signals may be received from and transmitted in all directions. The wireless signal 388 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 388 may be transmitted directly to other wireless devices using sidelink communications (e.g., using a PC5 interface, using a DSRC interface, etc.). Wireless transceivers 378 may be configured to transmit RF signals for performing sidelink communications via antenna 387 in accordance with one or more transmit power parameters that may be associated with one or more regulation modes. Wireless transceivers 378 may also be configured to receive sidelink communication signals having different signal parameters from other wireless devices.

In some examples, the one or more wireless transceivers 378 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 388 into a baseband or intermediate frequency and may convert the RF signals to the digital domain.

In some cases, the computing system 370 may include a coding-decoding device (or CODEC) configured to encode and/or decode data transmitted and/or received using the one or more wireless transceivers 378. In some cases, the computing system 370 may include an encryption-decryption device or component configured to encrypt and/or decrypt data (e.g., according to the AES and/or DES standard) transmitted and/or received by the one or more wireless transceivers 378.

The one or more SIMs 374 may each securely store an international mobile subscriber identity (IMSI) number and related key assigned to the user of the wireless device 307. The IMSI and key may be used to identify and authenticate the subscriber when accessing a network provided by a network service provider or operator associated with the one or more SIMs 374. The one or more modems 376 may modulate one or more signals to encode information for transmission using the one or more wireless transceivers 378. The one or more modems 376 may also demodulate signals received by the one or more wireless transceivers 378 in order to decode the transmitted information. In some examples, the one or more modems 376 may include a Wi-Fi modem, a 4G (or LTE) modem, a 5G (or NR) modem, and/or other types of modems. The one or more modems 376 and the one or more wireless transceivers 378 may be used for communicating data for the one or more SIMs 374.

The computing system 370 may also include (and/or be in communication with) one or more non-transitory machine-readable storage media or storage devices (e.g., one or more memory devices 386), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 386 and executed by the one or more processor(s) 384 and/or the one or more DSPs 382. The computing system 370 may also include software elements (e.g., located within the one or more memory devices 386), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the wireless device 307 may include means for performing operations described herein. The means may include one or more of the components of the computing system 370. For example, the means for performing operations described herein may include one or more of input device(s) 372, SIM(s) 374, modems(s) 376, wireless transceiver(s) 378, output device(s) (380), DSP(s) 382, processors (384), memory device(s) 386, and/or antenna(s) 387.

In some aspects, wireless device 307 may correspond to a user equipment (UE) and may include: means for obtaining configuration information for communicating with one or more aircrafts: means for generating a message based at least in part on the configuration information; and means for outputting the message for transmission to at least one aircraft of the one or more aircrafts. In some examples, the means for obtaining may include the one or more wireless transceivers 378, the one or more modems 376, the one or more SIMs 374, the one or more processors 384, the one or more DSPs 382, the one or more memory devices 386, any combination thereof, or other component(s) of the wireless device. In some cases, the means for generating the message may include the one or more processors 384, the one or more DSPs 382, the one or more memory devices 386, any combination thereof, or other component(s) of the wireless device. In some cases, the means for outputting for transmission may include the one or more wireless transceivers 378, the one or more modems 376, the one or more SIMs 374, the one or more processors 384, the one or more DSPs 382, the one or more memory devices 386, any combination thereof, or other component(s) of the wireless device.

In some examples, wireless device 307 may correspond to an aircraft and may include: means for obtaining at least one message from a terrestrial user equipment (UE); and means for outputting data associated with the at least one message for transmission to a base station. In some examples, the means for obtaining may include the one or more wireless transceivers 378, the one or more modems 376, the one or more SIMs 374, the one or more processors 384, the one or more DSPs 382, the one or more memory devices 386, any combination thereof, or other component(s) of the wireless device. In some cases, the means for outputting for transmission may include the one or more wireless transceivers 378, the one or more modems 376, the one or more SIMs 374, the one or more processors 384, the one or more DSPs 382, the one or more memory devices 386, any combination thereof, or other component(s) of the wireless device.

In some cases, the wireless device 307 may correspond to a network entity (e.g., an eNB, a gNB, a server, a device implementing a network function, etc.) and may include: means for obtaining one or more measurements associated with a user equipment (UE): means for identifying, based on the one or more measurements, at least one aircraft configured to communicate with the UE; and means for outputting configuration information associated with the at least one aircraft for transmission to the UE. In some examples, the means for obtaining may include the one or more wireless transceivers 378, the one or more modems 376, the one or more SIMs 374, the one or more processors 384, the one or more DSPs 382, the one or more memory devices 386, any combination thereof, or other component(s) of the wireless device. In some aspects, the means for identifying may include the one or more processors 384, the one or more DSPs 382, the one or more wireless transceivers 378, the one or more modems 376, the one or more memory devices 386, any combination thereof, or other component(s) of the wireless device. In some cases, the means for outputting for transmission may include the one or more wireless transceivers 378, the one or more modems 376, the one or more SIMs 374, the one or more processors 384, the one or more DSPs 382, the one or more memory devices 386, any combination thereof, or other component(s) of the wireless device.

Figure 4:
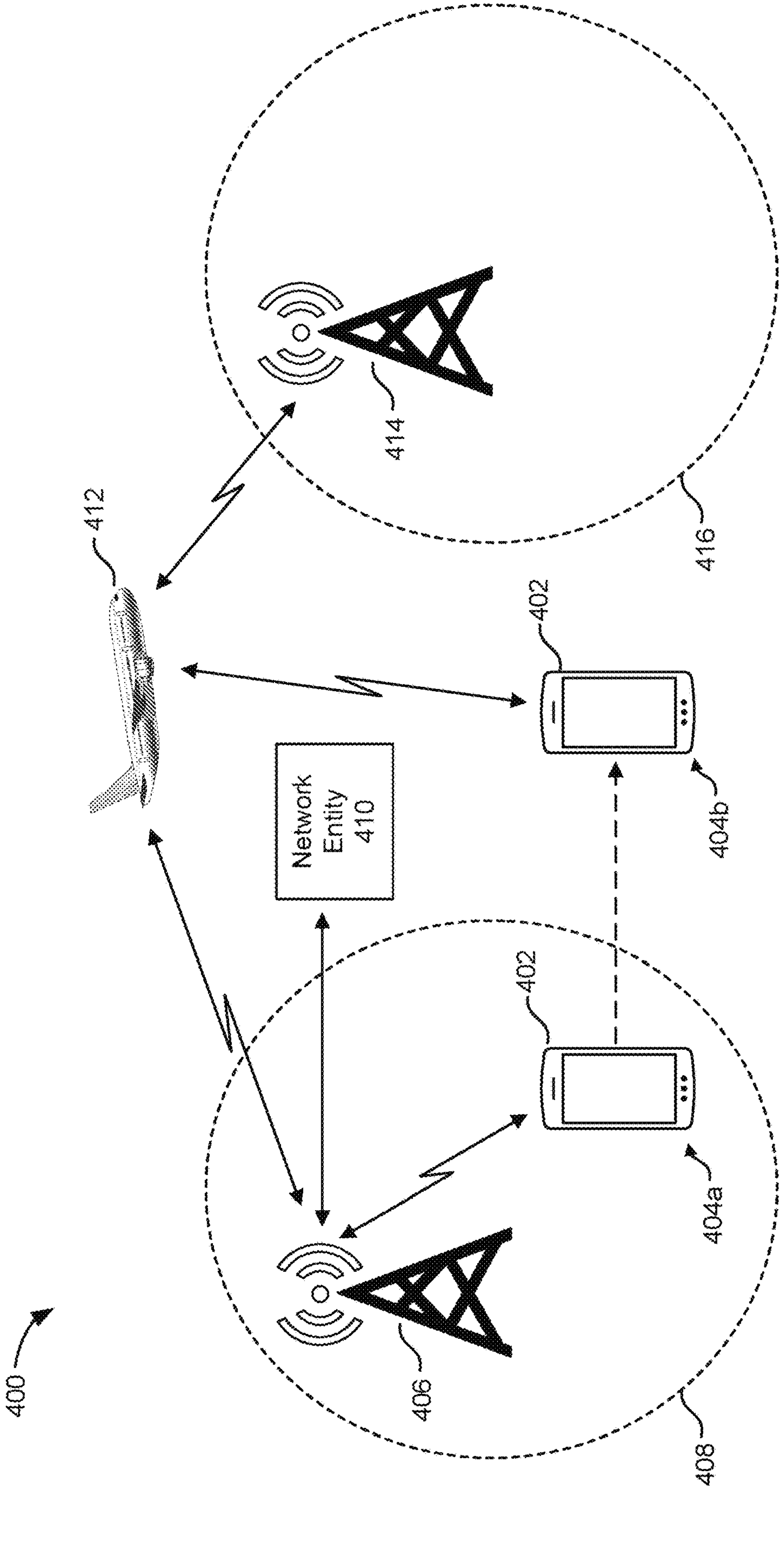
FIG. 4 is a diagram illustrating an example wireless communications system for implementing message relaying using air-to-ground connections, according to aspects of the disclosure.

As noted previously, systems and techniques are described herein for performing wireless communications using air-to-ground (ATG) connections. FIG. 4 is a diagram illustrating an example wireless communications system 400 for performing wireless communications using ATG connections. In some aspects, the system 400 may include a user equipment (UE) such as UE 402. As noted above, UE 402 can include any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network.

In some examples, system 400 can include one or more base stations such as base station 406 and base station 414. In some aspects, each base station can be associated with a respective geographic coverage area. For instance, base station 406 can be associated with coverage area 408 and base station 414 can be associated with coverage area 416.

In some cases, system 400 can include one or more network entities such as network entity 410. In some examples, network entity may correspond to a server (e.g., location server 230, an Aircraft Information Management Server (AIMS), and/or any other type of server or computing device) that can be configured to perform one or more network functions. In some aspects, the network functions performed by network entity 410 can include a location management function (e.g., LMF 270), access and mobility management function (e.g., AMF 264), aircraft information management function (AIMF), and/or any other function as described with respect to wireless network structure 200 and/or wireless network structure 250.

In some aspects, UE 402 can communicate with base station 406 when UE 402 is within coverage area 408 (e.g., UE 402 can communicate with base station 406 from position 404*a*). In some examples, UE 402 can send or transmit data (e.g., measurements, context parameters, operating conditions, etc.) to base station 406 and/or to network entity 410 (e.g., via base station 406). For example, UE 402 can report (e.g., transmit) one or more measurements that can include layer 1 (e.g., physical layer) measurements, layer 2 (e.g., data link layer) measurements, layer 3 (e.g., radio resource control (RRC) layer) measurements, and/or any other measurements that can be determined by UE 402. In some aspects, UE 402 can report one or more context parameters that can include global navigation satellite system (GNSS) data, route data, destination data, and/or any other type of UE context data.

In some cases, base station 406 and/or network entity 410 can use the data (e.g., measurements, context parameters, operating conditions, etc.) received from UE 402 to determine a movement of UE 402 (e.g., from position 404*a* to position 404*b*). In some examples, base station 406 and/or network entity 410 can determine that a prospective position of UE 402 (e.g., position 404*b*) is outside of a network coverage area. For instance, base station 406 and/or network entity 410 can determine that at position 404*b* UE 402 is outside coverage area 408 that is associated with base station 406 and that at position 404*b* UE 402 is also outside coverage area 416 that is associated with base station 414 (e.g., no network coverage is available for UE 402 at position 404*b*).

In some examples, base station 406 and/or network entity 410 can determine that UE 402 can communicate with one or more aircrafts (e.g., aircraft 412) from position 404*b*. In some aspects, base station 406 and/or network entity 410 can configure UE 402 to communicate with aircraft 412. In some cases, base station 406 and/or network entity 410 can send configuration information to UE 402 for communicating with aircraft 412 using radio resource control (RRC) signaling. In some aspects, the configuration information can include resource information for a random-access channel (RACH) preamble (e.g., frequency domain and/or time domain resource information), a RACH preamble format, an aircraft route, an aircraft flight time, a timing advance (TA) parameter, an inactive radio network temporary identifier (I-RNTI) parameter, data related to discovery signals transmitted by an aircraft, and/or any other type of network parameter suitable for configuring communication between UE 402 and aircraft 412.

In some examples, the configuration information can be provided to UE 402 in the radio access network-based notification area (RNA) using one or more information elements (IEs). In one illustrative example, an 'Aircraft-information-config' IE can be used to provide the configuration information to UE 402. In another illustrative example, an 'Aircraft-information-config-index' IE can be used to indicate a number of IEs that include configuration information (e.g., an integer value indicating a maximum number of 'Aircraft-information-config' IEs).

In some cases, the configuration information and/or the corresponding IEs may be associated with a particular aircraft (e.g., aircraft 412) and/or an aircraft schedule. In some examples, the configuration information and/or the corresponding IEs may be associated with multiple aircrafts and/or multiple aircraft schedules. For example, base station 406 and/or network entity 410 may provide UE 402 with configuration information corresponding to multiple aircrafts. In some cases, UE 402 may use configuration information associated with multiple aircrafts to select an aircraft (e.g., aircraft 412) with which to communicate. In some aspects, the configuration information and/or the corresponding IEs can be provided (e.g., transmitted, sent, configured, etc.) to UE 402 by base station 406 when network entity 410 (e.g., AMF 264, LMF 270, etc.) determines that UE 402 will be outside of network coverage (e.g., UE 402 will be outside of coverage area 408 and coverage area 416).

In some aspects, the RNA may include information associated with one or more base stations (e.g., base station 406 and/or base station 414) and/or one or more aircrafts (e.g., aircraft 412). In some examples, base station 406 and aircraft 412 can be in the same RNA. In some cases, aircraft 412 may receive data that is associated with UE 402 from the last base station that was associated with UE 402 (e.g., base station 406 can transmit data associated with UE 402 to aircraft 412). In some examples, the data associated with UE 402 can include UE travelling information and/or UE context parameters such as global navigation satellite system (GNSS) data, route data, destination data, and/or any other type of UE context data.

In some examples, base station 406 may cause UE 402 to enter an inactive mode when base station 406 and/or network entity 410 determines that UE 402 will be outside of network coverage (e.g., UE 402 will be outside of coverage area 408 and coverage area 416). In some cases, base station 406 may transmit a message (e.g., an RRC release message) to UE 402 with an indication that UE 402 is to enter an inactive, idle, and/or suspended mode of operation (e.g., UE 402 transitions to RRC inactive state).

In some aspects, UE 402 may communicate with aircraft 412 when it is at position 404*b* (e.g., outside of coverage area 408 and coverage area 416). In some examples, UE 402 may use the configuration information associated with aircraft 412 to transmit a small data transmission (SDT) to aircraft 412. In some aspects, the SDT from UE 402 to aircraft 412 can be transmitted when UE 402 is in an inactive mode (e.g., RRC inactive). In some cases, UE 402 can use the configuration information associated with aircraft 412 to transition from an inactive mode or an idle mode to a connected mode (e.g., RRC connected). In some aspects, UE 402 may transmit one or more data transmissions to aircraft 412 when UE 402 is in a connected mode. In some cases, aircraft 412 can be configured to relay and/or transmit data received from UE 402 (e.g., data associated with the SDT and/or data associated with any other transmission received from UE 402) to base station 414. In some examples, aircraft 412 can be configured to operate as a base station or an integrated access and backhaul (IAB) node.

In some aspects, base station 406 and/or network entity 410 can configure UE 402 to communicate with aircraft 412 using an application protocol (e.g., next-generation application protocol (NGAP)). For example, network entity 410 can correspond to a location server (e.g., location server 230 and/or an Aircraft Information Management Server (AIMS)) that can be configured to provide the aircraft configuration information to UE 402. As noted above, the configuration information can include resource information for a random-access channel (RACH) preamble (e.g., frequency domain and/or time domain resource information), a RACH preamble format, an aircraft route, an aircraft flight time, a timing advance (TA) parameter, an inactive radio network temporary identifier (I-RNTI) parameter, data related to discovery signals transmitted by an aircraft, and/or any other type of network parameter suitable for configuring communication between UE 402 and aircraft 412.

In some aspects, the application protocol for configuring UE 402 to communicate with aircraft 412 can be implemented using one or more network functions. For example, an access and mobility management function (AMF) and/or an aircraft information management function (AIMF) can be used to process an aircraft relaying service request. In some cases, the AMF and/or the AIMF can send an aircraft relaying request to aircraft 412. In some aspects, aircraft 412 can be configured to monitor for transmissions from UE 402 using the aircraft relaying service request. For instance, aircraft 412 can be configured to monitor for the initiation of a random access channel (RACH) process from UE 402 (e.g., RACH message 1). In some examples, UE 402 can use the configuration information (e.g., received from network entity 410) to communicate with aircraft 412. As noted above, aircraft 412 can be configured to transmit or relay data associated with transmissions received from UE 402 to base station 414.

Figure 5:
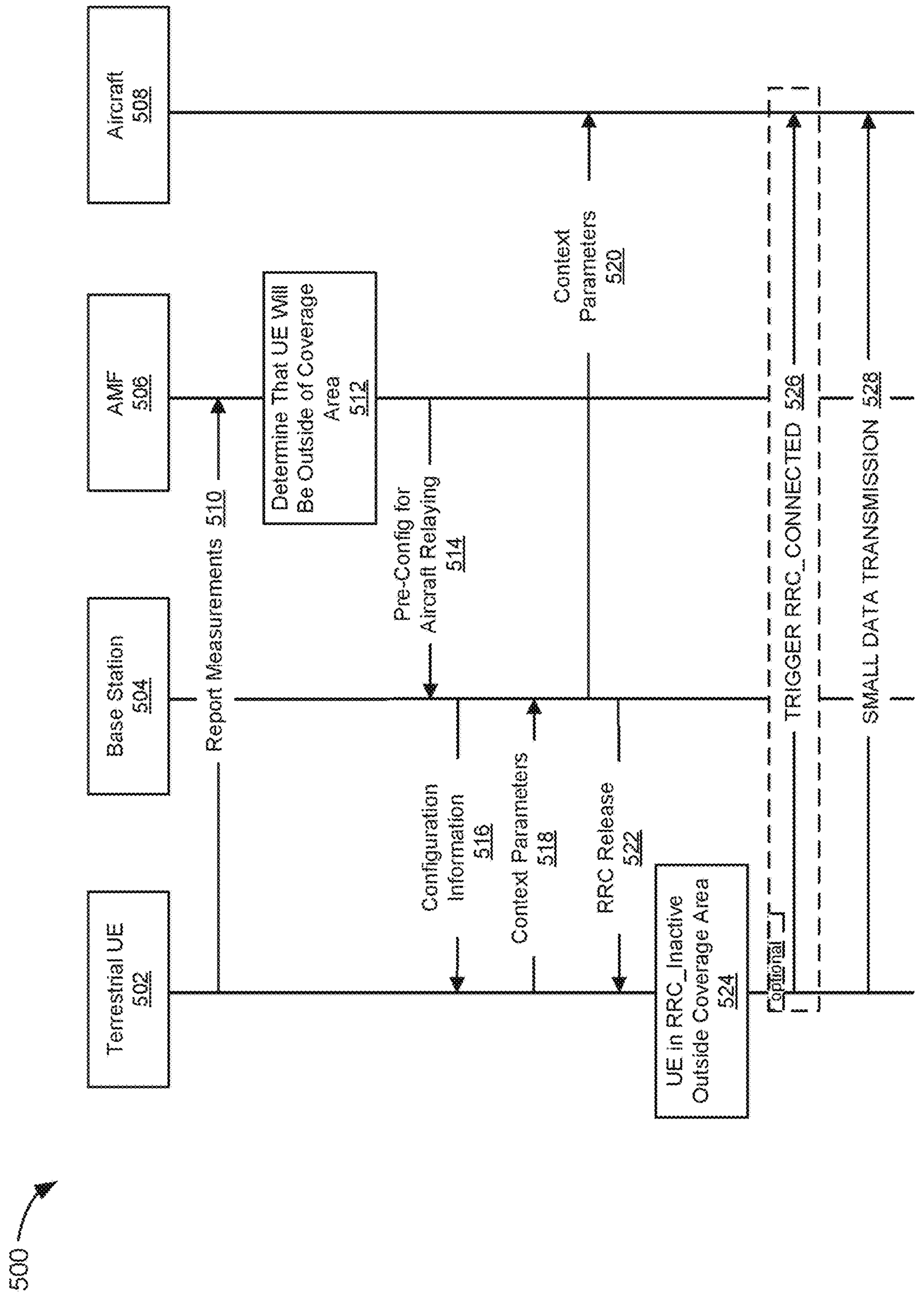
FIG. 5 is a sequence diagram illustrating an example of a sequence for performing message relaying using air-to-ground connections, according to aspects of the disclosure.

FIG. 5 is a sequence diagram illustrating an example of a sequence 500 for performing message relaying using air-to-ground connections. The sequence 500 may be performed by a terrestrial UE 502, a base station 504, an AMF 506, and an aircraft 508. At action 510, terrestrial UE 502 can transmit one or more measurements to AMF 506 (e.g., via base station 504). In some cases, the measurements can include layer 1 (e.g., physical layer) measurements, layer 2 (e.g., data link layer) measurements, layer 3 (e.g., radio resource control (RRC) layer) measurements, and/or any other measurements that can be determined by terrestrial UE 502.

At action 512, AMF 506 can use the measurements received from terrestrial UE 502 to determine that terrestrial UE 502 will be outside of network coverage. For example, AMF 506 can determine that a prospective position of terrestrial UE 502 is outside a coverage area associated with base station 504. In some aspects, AMF 506 may also determine that the prospective position of terrestrial UE 502 is outside the coverage area of other base stations (e.g., there are no target base stations available for receiving a handover).

At action 514, AMF 506 can send a message to base station 504 that can trigger pre-configuration for performing aircraft relaying. At action 516, base station 504 can send aircraft configuration information associated with one or more aircrafts (e.g., aircraft 508) to terrestrial UE 502. In some examples, the configuration information can include resource information for a random-access channel (RACH) preamble (e.g., frequency domain and/or time domain resource information), a RACH preamble format, an aircraft route, an aircraft flight time, a timing advance (TA) parameter, an inactive radio network temporary identifier (I-RNTI) parameter, data related to discovery signals transmitted by an aircraft, and/or any other type of network parameter suitable for configuring communication between terrestrial UE 502 and one or more aircrafts (e.g., aircraft 508). In some examples, the configuration information can be provided to terrestrial UE 502 in the radio access network-based notification area (RNA) using one or more information elements (IEs).

At action 518, terrestrial UE 502 can transmit UE context parameters to base station 504. In some cases, UE context parameters can include global navigation satellite system (GNSS) data, route data, destination data, and/or any other type of UE context data. At action 520, base station 504 can forward the UE context parameters to aircraft 508. In some aspects, aircraft 508 can request context parameters from base station 504. In some examples, aircraft 508 and base station 504 can be part of a RAN-based notification area (RNA).

At action 522, base station 504 can transmit an RRC release message to terrestrial UE 502. In some cases, the RRC release message can be transmitted when base station 504 and/or AMF 506 determine that terrestrial UE 502 will be outside of network coverage. At action 524, terrestrial UE 502 may enter an inactive, idle, and/or suspended mode of operation (e.g., in response to RRC release message received from base station 504).

At action 526, terrestrial UE 502 may trigger a transition from RRC inactive mode to RRC connected mode based on the aircraft configuration information associated with aircraft 508. For example, terrestrial UE 502 may transmit RACH message 1 in order to associate with aircraft 508 (e.g., aircraft 508 can be identified as a base station). At action 528, terrestrial UE 502 may transmit a small data transmission (SDT) to aircraft 508. In some cases, the SDT can be transmitted while terrestrial UE 502 remains in an inactive state (e.g., without performing action 526 to trigger transition to RRC connected mode). In some aspects, aircraft 508 can be configured to relay and/or transmit data received from terrestrial UE 502 to at least one base station (not illustrated in FIG. 5).

Figure 6:
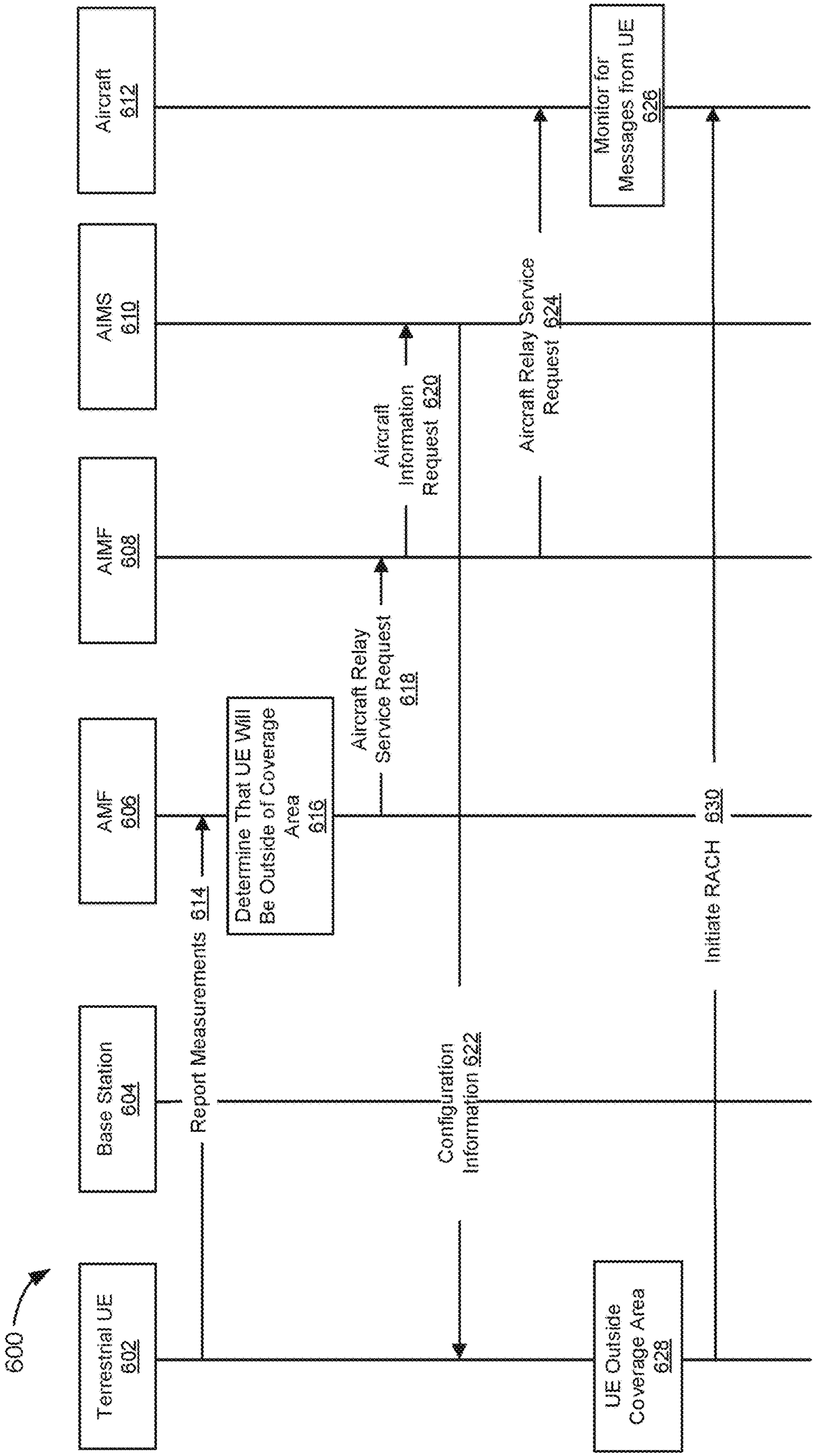
FIG. 6 is a sequence diagram illustrating another example of a sequence for performing message relaying using air-to-ground connections, according to aspects of the disclosure.

FIG. 6 is a sequence diagram illustrating an example of a sequence 600 for performing message relaying using air-to-ground connections. The sequence 600 may be performed by a terrestrial UE 602, a base station 604, an AMF 606, an AIMF 608, an AIMS 610 and an aircraft 612. At action 614, terrestrial UE 602 can transmit one or more measurements to AMF 606 (e.g., via base station 604). In some cases, the measurements can include layer 1 (e.g., physical layer) measurements, layer 2 (e.g., data link layer) measurements, layer 3 (e.g., radio resource control (RRC) layer) measurements, and/or any other measurements that can be determined by terrestrial UE 602.

At action 616, AMF 606 can use the measurements received from terrestrial UE 602 to determine that terrestrial UE 602 will be outside of network coverage. For example, AMF 606 can determine that a prospective position of terrestrial UE 602 is outside a coverage area associated with base station 604. In some aspects, AMF 606 may also determine that the prospective position of terrestrial UE 602 is outside the coverage area of other base stations (e.g., there are no target base stations available for receiving a handover).

At action 618, AMF 606 can transmit an aircraft relay service request to AIMF 618. At action 620, AIMF 618 can transmit an aircraft information request to AIMS 610. At action 622, AIMS can send aircraft configuration information associated with one or more aircrafts (e.g., aircraft 612) to terrestrial UE 602. In some aspects, the configuration information can include resource information for a random-access channel (RACH) preamble (e.g., frequency domain and/or time domain resource information), a RACH preamble format, an aircraft route, an aircraft flight time, a timing advance (TA) parameter, an inactive radio network temporary identifier (I-RNTI) parameter, data related to discovery signals transmitted by an aircraft, and/or any other type of network parameter suitable for configuring communication between terrestrial UE 602 and one or more aircrafts (e.g., aircraft 612).

At action 624, AIMF 608 can transmit an aircraft relay service request to aircraft 612. In some examples, the aircraft relay service request can include data associated with terrestrial UE 602. For instance, the aircraft relay service request can include UE context parameters such as global navigation satellite system (GNSS) data, route data, destination data, and/or any other type of UE context data. In response to receiving the aircraft relay service request, aircraft 612 can monitor for messages from terrestrial UE 602 at action 626.

At action 628, terrestrial UE 602 can be located at a position that is outside of a network coverage area. For example, terrestrial UE 602 can move outside of a coverage area associated with base station 604. In some aspects, terrestrial UE 602 may be located at a position having degraded and/or unsatisfactory network coverage (e.g., at the fringe of coverage area associated with base station 604). In some aspects, terrestrial UE 602 may initiate communication with aircraft 612 (e.g., when terrestrial UE 602 has poor or no network coverage). For instance, at action 630 terrestrial UE 602 can use the configuration information associated with aircraft 612 to initiate a RACH process with aircraft 612. In some examples, aircraft 612 can be configured to relay or transmit data associated with transmission from terrestrial UE 602 to one or more other network entities (e.g., to another base station).

Figure 7:
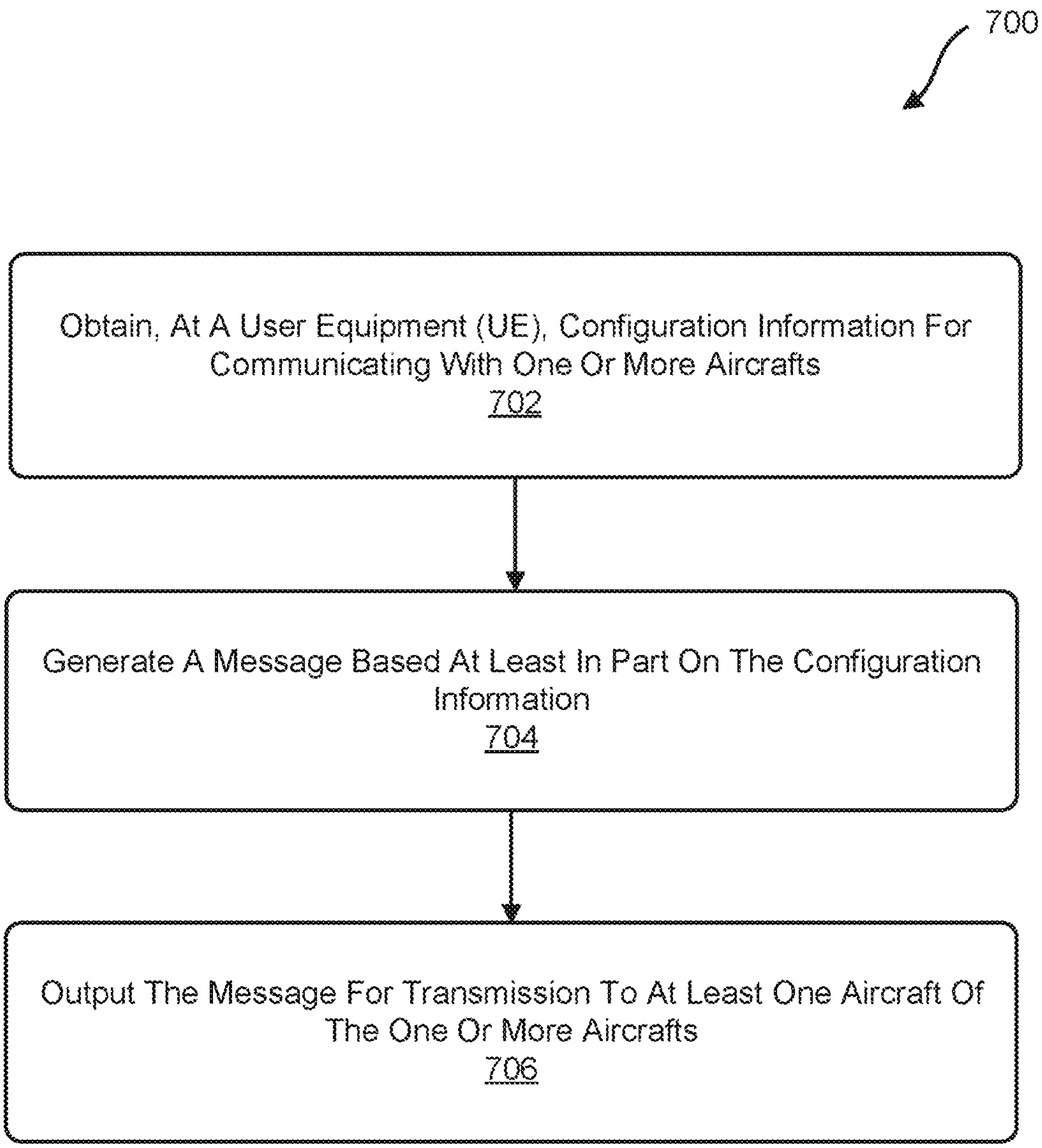
FIG. 7 is a flow diagram illustrating an example of a process implemented by a user equipment (UE) for performing message relaying using air-to-ground connections, according to aspects of the disclosure.

FIG. 7 is a flowchart diagram illustrating an example of a process 700 for a user equipment (UE) (or a component or device of the UE, such as a chipset, circuit, or other component/device of the UE) to perform message relaying using air-to-ground connections. At block 702, the process 700 includes obtaining, at the UE, configuration information for communicating with one or more aircrafts. For example, UE 402 may receive (e.g., via a transceiver) or a chipset or other component of the UE 402 can obtain configuration information for communicating with aircraft 412 from base station 406 and/or from network entity 410. In some aspects, the configuration information may include at least one of resource information for a random-access channel (RACH) preamble, a RACH preamble format, an aircraft route, an aircraft flight time, a timing advance (TA) parameter, and an inactive radio network temporary identifier (I-RNTI) parameter. In some examples, the configuration information may be obtained (e.g., received) using a radio resource control (RRC) protocol message. For example, terrestrial UE 502 can receive the configuration information from base station 504 via a RRC message (e.g., an information element). In some cases, the configuration information can be obtained (e.g., received) using an application layer protocol message. For instance, terrestrial UE 602 can receive the configuration information from a server (e.g., AIMS 610).

At block 704, the process 700 includes generating a message based at least in part on the configuration information. For instance, UE 402 (or component or device thereof) can use the configuration information to generate the message. In some examples, the message transmitted to the at least one aircraft can include at least one of a small data transmission (SDT), a random-access channel (RACH) preamble transmission, and a scheduled uplink transmission. For example, UE 402 can transmit at least one of a small data transmission, a RACH preamble transmission, and a scheduled uplink transmission to aircraft 412.

At block 706, the process 700 includes outputting the message for transmission to at least one aircraft of the one or more aircrafts, transmitting, based at least on the configuration information. For instance, UE 402 can transmit (using a transceiver of the UE 402) the message to aircraft 412 or a chipset or other component of the UE 402 can output the message for transmission to aircraft 412. In some examples, UE 402 can transmit the message using (or a component of UE 402 can output the message for transmission on) at least one of a small data transmission, a RACH preamble transmission, and a scheduled uplink transmission to aircraft 412. In some aspects, the at least one aircraft can correspond to at least one of a base station and an integrated access and backhaul (IAB) node.

In some examples, the process 700 can include output for transmission or can transmit (e.g., using a transceiver) one or more UE context parameters associated with the UE to a network entity. In some cases, the one or more UE context parameters include at least one of global navigation satellite system (GNSS) data associated with the UE, route data associated with the UE, and destination data associated with the UE. For instance, UE 402 can transmit (or a chipset or other component of the UE 402 can output for transmission) GNSS data, route data, and/or destination data to base station 406 and/or network entity 410.

In some aspects, the process 700 can include selecting the at least one aircraft from the one or more aircrafts based on the configuration information and at least one of the one or more UE context parameters. For example, UE 402 (or component or device thereof) can select aircraft 412 from a group of available aircrafts (not illustrated in FIG. 4) based on the aircraft configuration information and at least one of the UE context parameters. In one illustrative example, UE 402 (or component or device thereof) can select aircraft 412 based on an aircraft route that can be associated with GNSS data corresponding to UE 402 at position 404*b*.

In some cases, the process 700 can include obtain, from a base station, a radio resource control (RRC) release message, wherein the RRC release message indicates that the UE is to enter an RRC inactive mode. For instance, UE 402 can receive (e.g., via a transceiver) or a chipset or other component of the UE 402 can obtain an RRC release message from base station 406 indicating that UE 402 is to enter RRC inactive mode. In some aspects, the process 700 can include transitioning the UE from the RRC inactive mode to an RRC connected mode based on the configuration information. For example, UE 402 (or component or device thereof) can transition from an RRC inactive mode to an RRC connected mode by using the configuration information to associate with aircraft 412.

Figure 8:
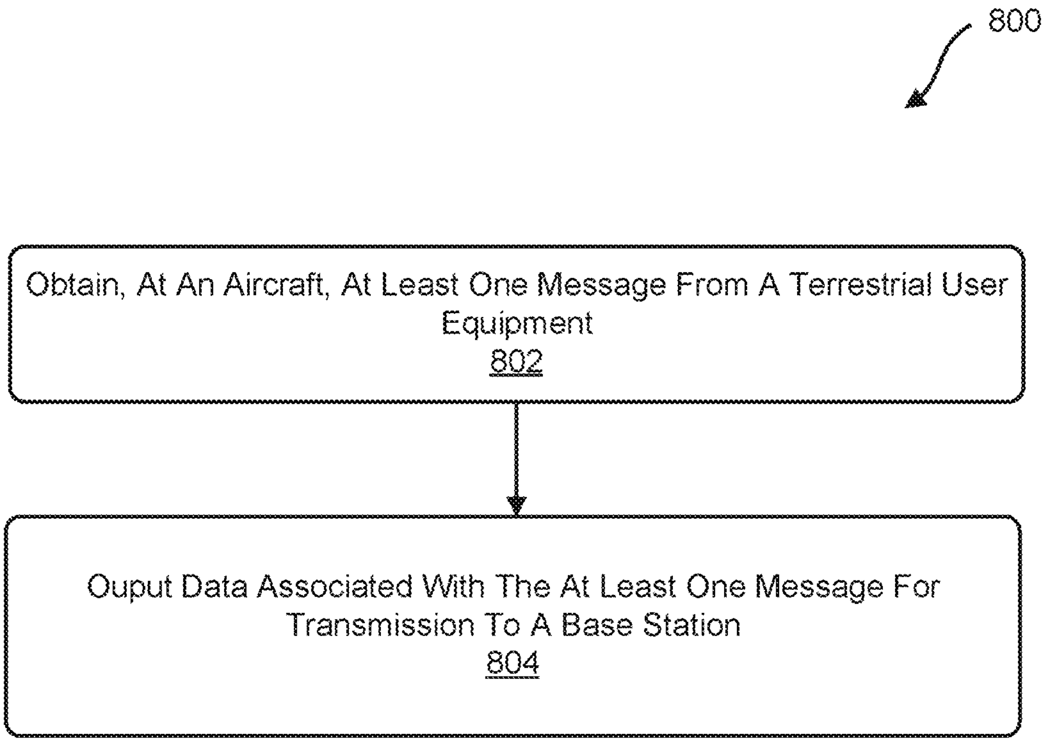
FIG. 8 is a flow diagram illustrating an example of a process implemented by an aircraft for performing message relaying using air-to-ground connections, according to aspects of the disclosure.

FIG. 8 is a flowchart diagram illustrating an example of a process 800 for an aircraft (or a component or device of the aircraft, such as a chipset, circuit, or other component/device of the aircraft) to perform message relaying using air-to-ground connections. At block 802, the process 800 includes obtaining, at the aircraft, at least one message from a terrestrial user equipment. For example, aircraft 412 can receive (e.g., via a transceiver) or a chipset or other component of the aircraft 412 can obtain at least one message from UE 402. In some aspects, the at least one message from the terrestrial UE can correspond to an SOS message. For instance, aircraft 412 can receive (e.g., via a transceiver) or a chipset or other component of the aircraft 412 can obtain an SOS message from UE 402.

In some aspects, the process 800 can include obtaining at least one of a small data transmission (SDT), a random-access channel (RACH) preamble message, and a scheduled uplink transmission. For example, aircraft 412 can receive (e.g., via a transceiver) or a chipset or other component of the aircraft 412 can obtain an SDT, a RACH preamble message, and/or an uplink transmission from UE 402.

In some cases, the process 800 can include outputting configuration information associated with the aircraft for output to a network entity. For instance, the configuration information may include at least one of resource information for a random-access channel (RACH) preamble, a RACH preamble format, an aircraft route, an aircraft flight time, a timing advance (TA) parameter, and an inactive radio network temporary identifier (I-RNTI) parameter. For example, aircraft 412 can transmit (e.g., via a transceiver) or a chipset or other component of the aircraft 412 can output for transmission configuration information to network entity 410. In some cases, network entity 410 can correspond to a location server such as location server 230 and/or aircraft information management server (AIMS) 610.

At block 804, the process 800 includes outputting data associated with the at least one message for transmission to a base station. For example, aircraft 412 can transmit (e.g., via a transceiver) or a chipset or other component of the aircraft 412 can output for transmission data associated with a message obtained (e.g., received) from UE 402 to base station 414. In some cases, the aircraft and the base station can be in a same radio access network based notification area (RNA). For example, aircraft 412 can be in a same RNA as base station 406 and/or base station 414.

In some examples, the process 800 can include obtaining, from a network entity, one or more UE context parameters associated with the terrestrial UE. For example, the one or more UE context parameters may include at least one of global navigation satellite system (GNSS) data associated with the terrestrial UE, route data associated with the terrestrial UE, and destination data associated with the terrestrial UE. For instance, base station 406 and/or network entity 410 can transmit (e.g., via a transceiver) or a chipset or other component of the aircraft 412 can output for transmission one or more UE context parameters associated with UE 402 to aircraft 412.

Figure 9:
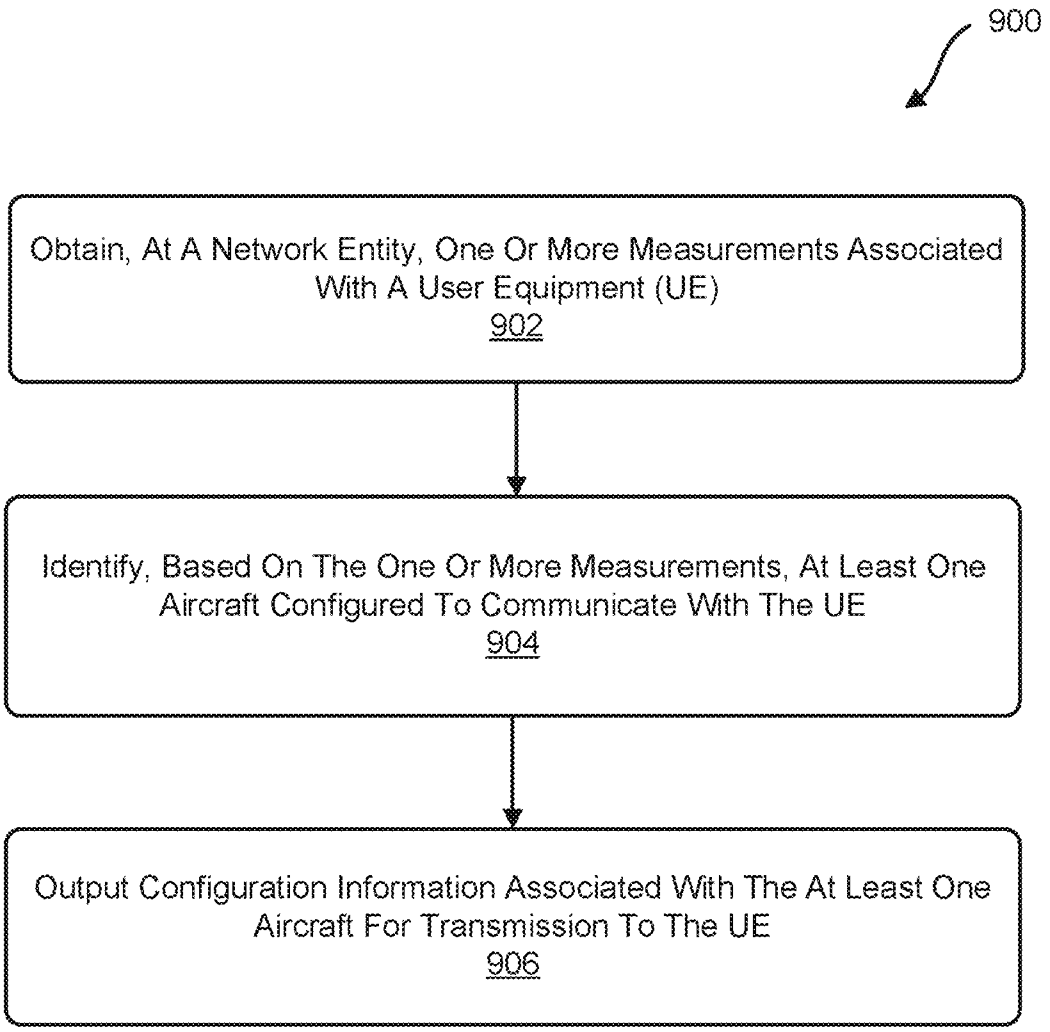
FIG. 9 is a flow diagram illustrating an example of a process implemented by a network entity for performing message relaying using air-to-ground connections, according to aspects of the disclosure.

FIG. 9 is a flowchart diagram illustrating an example of a process 900 for a network entity (or a component or device of the UE, such as a chipset, circuit, or other component/device of the network entity) to perform message relaying using air-to-ground connections. In some examples, network entity may correspond to a server (e.g., location server 230, an Aircraft Information Management Server (AIMS), and/or any other type of server or computing device) that can be configured to perform one or more network functions.

At block 902, the process 900 includes obtaining, at a network entity, one or more measurements associated with a user equipment (UE). For example, network entity 410 can receive (e.g., via a transceiver) or a chipset or other component of the aircraft 412 can obtain one or more measurements associated with UE 402. In some examples, the one or more measurements can include layer 1 (e.g., physical layer) measurements, layer 2 (e.g., data link layer) measurements, layer 3 (e.g., radio resource control (RRC) layer) measurements, and/or any other measurements that can be determined by UE 402.

At block 904, the process 900 includes identifying, based on the one or more measurements, at least one aircraft configured to communicate with the UE. For example, network entity 410 (or component or device thereof) can use the one or more measurements to identify aircraft 412 that can be configured to communicate with UE 402. In some aspects, process 900 can include determining, based on the one or more measurements, a prospective position of the UE. In some cases, the prospective position is outside a network coverage area. For example, the at least one aircraft may be identified based on the prospective position of the UE. For instance, network entity 410 (or component or device thereof) can use the one or more measurements to determine that UE 402 will be located at or near position **404*b*. In some aspects, network entity 410 (or component or device thereof) can determine that position 404*b* is outside coverage area 408 associated with base station 406 and that position 404*b* is outside coverage area 416 associated with base station 414. In some cases, network entity 410 (or component or device thereof) can identify aircraft 412 based on the prospective position 404*b* of UE 402**.

At block 906, the process 900 includes outputting configuration information associated with the at least one aircraft for transmission to the UE. For example, network entity 410 can transmit (e.g., via base station 406) or a chipset or other component of the UE 402 can output the message for transmission (e.g., via base station 406) configuration information associated with aircraft 412 to UE 402. In some aspects, the configuration information can include at least one of resource information for a random-access channel (RACH) preamble, a RACH preamble format, an aircraft route, an aircraft flight time, a timing advance (TA) parameter, and an inactive radio network temporary identifier (I-RNTI) parameter. In some examples, the configuration information can be obtained (e.g., received) from the at least one aircraft. For instance, network entity 410 can receive (e.g., via a transceiver) or a chipset or other component of the UE 402 can obtain configuration information from aircraft 412. In some aspects, the configuration information can be obtained (e.g., received) from an aircraft information management server (AIMS). For example, network entity 410 can receive (e.g., via a transceiver) or a chipset or other component of the UE 402 can obtain aircraft information from AIMS 610 (not illustrated in FIG. 4).

In some examples, the process 900 can include outputting a service request message for transmission to the at least one aircraft. For example, network entity 410 can transmit (e.g., via a transceiver) or a chipset or other component of the UE 402 can output the message for transmission an aircraft relay service request message to aircraft 412. In some aspects, the relay service request message can include data associated with UE 402. For instance, the relay service request message can include UE context data such as global navigation satellite system (GNSS) data associated with the UE, route data associated with the UE, and destination data associated with the UE.

In some examples, the processes described herein (e.g., process 700, process 800, process 900, and/or other process described herein) may be performed by a computing device or apparatus (e.g., a UE, a base station, etc.). In one example, the process 700 may be performed by a wireless communication device, such as a UE (e.g., the UE 402 of FIG. 4, a mobile device, and/or other UE or device). In another example, the process 700, the process 800, and/or the process 900 may be performed by a computing device with the computing system 1000 shown in FIG. 10. For instance, a wireless communication device (e.g., the UE 402 of FIG. 4, mobile device, and/or other UE or device) with the computing architecture shown in FIG. 10 may include the components of the UE and may implement the operations of FIG. 7. In another example, process 800 may be performed by an aircraft, such as the aircraft 412 of FIG. 4. In another example, the process 800 may be performed by a computing device with the computing system 1000 shown in FIG. 10. For instance, an aircraft (e.g., the aircraft 412 of FIG. 4) with the computing architecture shown in FIG. 10 may include the components of the aircraft and may implement the operations of FIG. 8. In another example, process 900 may be performed by a base station, such as the base station 102 of FIG. 1. In another example, the process 900 may be performed by a computing device with the computing system 1000 shown in FIG. 10. For instance, a base station (e.g., the base station 102 of FIG. 1) with the computing architecture shown in FIG. 10 may include the components of the base station and may implement the operations of FIG. 9.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 700, 800, and 900 are illustrated as logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the processes 700, 800, 900, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Illustrative Aspects of the disclosure include:

Aspect 1: A method for wireless communications performed at a user equipment (UE), comprising: obtaining, at the UE, configuration information for communicating with one or more aircrafts: generate a message based at least in part on the configuration information; and outputting the message for transmission to at least one aircraft of the one or more aircrafts.

Aspect 2: The method of Aspect 1, further comprising: outputting one or more UE context parameters associated with the UE for transmission to a network entity, wherein the one or more UE context parameters include at least one of global navigation satellite system (GNSS) data associated with the UE, route data associated with the UE, and destination data associated with the UE.

Aspect 3: The method of Aspect 2, further comprising: selecting the at least one aircraft from the one or more aircrafts based on the configuration information and at least one of the one or more UE context parameters.

Aspect 4: The method of any one of Aspects 1 to 3, wherein the configuration information includes at least one of resource information for a random-access channel (RACH) preamble, a RACH preamble format, an aircraft route, an aircraft flight time, a timing advance (TA) parameter, and an inactive radio network temporary identifier (I-RNTI) parameter.

Aspect 5: The method of any one of Aspects 1 to 4, wherein the configuration information is obtained via a radio resource control (RRC) protocol message.

Aspect 6: The method of any one of Aspects 1 to 5, wherein the configuration information is obtained via an application layer protocol message.

Aspect 7: The method of any one of Aspects 1 to 6, further comprising: obtaining a radio resource control (RRC) release message from a base station, wherein the RRC release message indicates that the UE is to enter an RRC inactive mode; and transitioning the UE from the RRC inactive mode to an RRC connected mode based on the configuration information.

Aspect 8: The method of any one of Aspects 1 to 7, wherein the message output for transmission to the at least one aircraft includes at least one of a small data transmission (SDT), a random-access channel (RACH) preamble message, and a scheduled uplink transmission.

Aspect 9: The method of any one of Aspects 1 to 8, wherein the at least one aircraft corresponds to at least one of a base station and an integrated access and backhaul (IAB) node.

Aspect 10: A method for wireless communications performed at an aircraft, comprising: obtaining at least one message from a terrestrial user equipment (UE); and outputting data associated with the at least one message for transmission to a base station.

Aspect 11: The method of Aspect 10, further comprising: obtaining, from a network entity, one or more UE context parameters associated with the terrestrial UE, wherein the one or more UE context parameters include at least one of global navigation satellite system (GNSS) data associated with the terrestrial UE, route data associated with the terrestrial UE, and destination data associated with the terrestrial UE.

Aspect 12: The method of any one of Aspects 10 or 11, wherein the aircraft and the base station are in a same Radio Access Network Based Notification Area (RNA).

Aspect 13: The method of any one of Aspects 10 to 12, further comprising: outputting configuration information associated with the aircraft for transmission to a network entity, wherein the configuration information includes at least one of resource information for a random-access channel (RACH) preamble, a RACH preamble format, an aircraft route, an aircraft flight time, a timing advance (TA) parameter, and an inactive radio network temporary identifier (I-RNTI) parameter.

Aspect 14: The method of any one of Aspects 10 to 13, wherein the at least one message from the terrestrial UE corresponds to an SOS message.

Aspect 15: The method of any one of Aspects 10 to 14, further comprising: obtaining, from the terrestrial UE, at least one of a small data transmission (SDT), a random-access channel (RACH) preamble message, and a scheduled uplink transmission.

Aspect 16: A method for wireless communications performed at a network entity, comprising: obtaining one or more measurements associated with a user equipment (UE); identifying, based on the one or more measurements, at least one aircraft configured to communicate with the UE; and outputting configuration information associated with the at least one aircraft for transmission to the UE.

Aspect 17: The method of Aspect 16, wherein the configuration information includes at least one of resource information for a random-access channel (RACH) preamble, a RACH preamble format, an aircraft route, an aircraft flight time, a timing advance (TA) parameter, and an inactive radio network temporary identifier (I-RNTI) parameter.

Aspect 18: The method of any one of Aspects 16 or 17, wherein the configuration information is obtained from the at least one aircraft.

Aspect 19: The method of any one of Aspects 16 or 17, wherein the configuration information is obtained from an aircraft information management server.

Aspect 20: The method of any one of Aspects 16 to 19, further comprising: determining, based on the one or more measurements, a prospective position of the UE, wherein the prospective position is outside a network coverage area, and wherein the at least one aircraft is identified based on the prospective position of the UE.

Aspect 21: The method of any one of Aspects 16 to 20, further comprising: outputting a service request message for transmission to the at least one aircraft.

Aspect 22: An apparatus for wireless communications, comprising: at least one memory; and at least one processor coupled to the at least one memory, wherein the at least one processor is configured to perform operations in accordance with any one of Aspects 1-21.

Aspect 23: A user equipment (UE), comprising: at least one transceiver; at least one memory comprising instructions; and at least one processor configured to execute the instructions and cause the UE to perform operations in accordance with any one of Aspects 1-9, wherein the at least one transceiver is configured to receive the configuration information or transmit the message.

Aspect 24: An aircraft, comprising: at least one transceiver: at least one memory comprising instructions; and at least one processor configured to execute the instructions and cause the aircraft to perform operations in accordance with any one of Aspects 10-15, wherein the at least one transceiver is configured to receive the at least one message or transmit the data associated with the at least one message.

Aspect 25: A network entity, comprising: at least one transceiver: at least one memory comprising instructions; and at least one processor configured to execute the instructions and cause the network entity to perform operations in accordance with any one of Aspects 16-21, wherein the at least one transceiver is configured to receive the one or more measurements or transmit the configuration information.

Aspect 26: An apparatus for wireless communications, comprising means for performing operations in accordance with any one of Aspects 1 to 21. In some aspects, the means for performing the operations may include means for obtaining information such as configuration information, a message, one or more measurements associated with a user equipment (UE), etc. The means for obtaining information may include the one or more wireless transceivers 378, the one or more modems 376, the one or more SIMs 374, the one or more processors 384, the one or more DSPs 382, the one or more memory devices 386, or any combination thereof. In some aspects, the means for performing the operations may include means for outputting information such as a message, data associated with a message, configuration information associated with at least one aircraft, etc. The means for outputting information may include the one or more wireless transceivers 378, the one or more modems 376, the one or more SIMs 374, the one or more processors 384, the one or more DSPs 382, the one or more memory devices 386, or any combination thereof. In some aspects, the means for performing the operations may include means for generating information such as a message. The means for generating information may include the one or more processors 384, the one or more DSPs 382, the one or more memory devices 386, or any combination thereof, or other component(s) of the wireless. In some aspects, the means for performing the operations may include means for identifying information or a device, such as identifying at least one aircraft configured to communicate with a UE based on the one or more measurements. The means for identifying information or a device may include the one or more processors 384, the one or more DSPs 382, the one or more wireless transceivers 378, the one or more modems 376, the one or more memory devices 386, any combination thereof.

Aspect 27: A non-transitory computer-readable medium comprising instructions that, when executed by an apparatus, cause the apparatus to perform operations in accordance with any one of Aspects 1 to 21.

Figure 10:
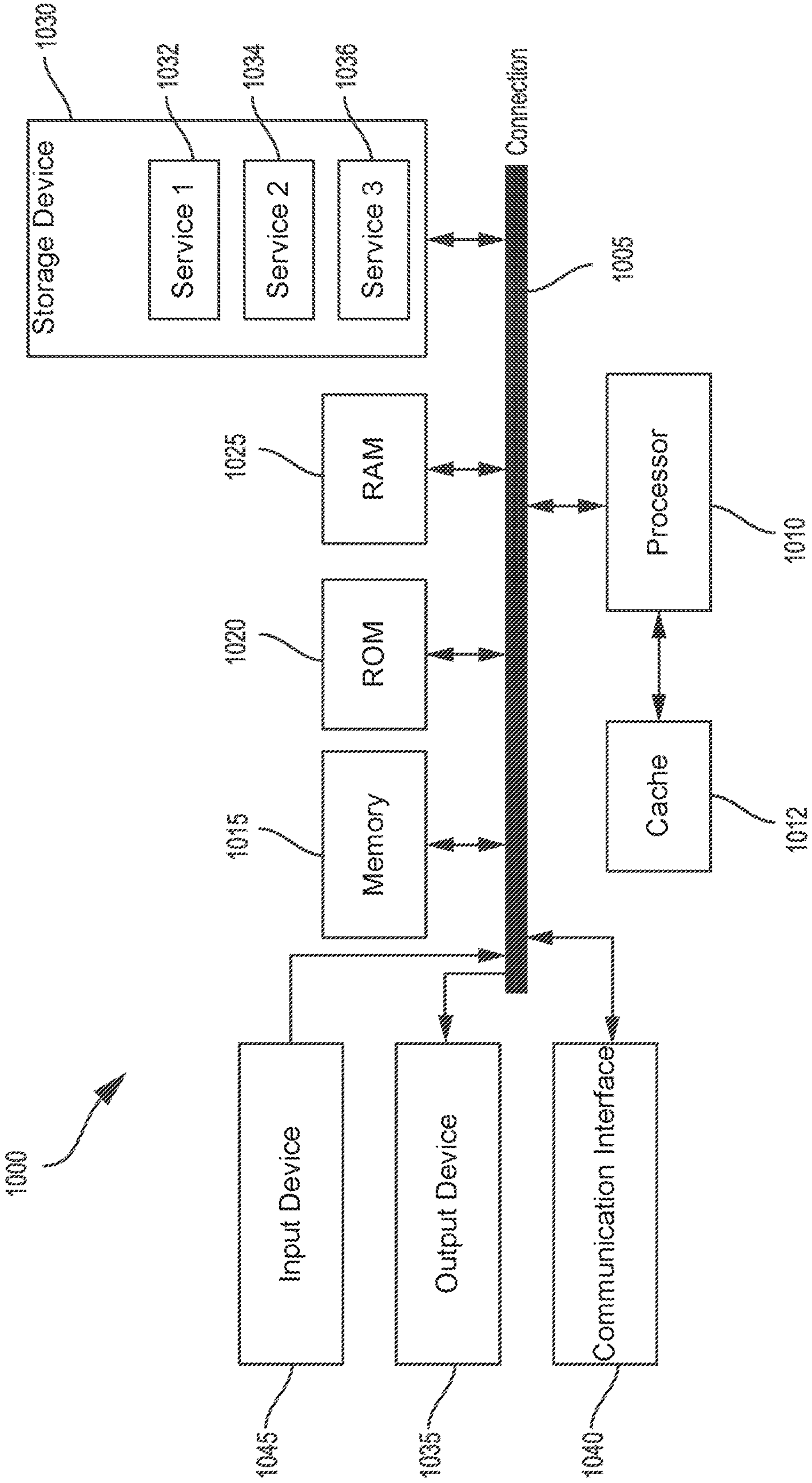
FIG. 10 is a block diagram illustrating an example of a computing system, according to aspects of the disclosure.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some aspects, computing system 1000 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, key board, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

What is claimed is:

1. An apparatus for wireless communications, comprising:

at least one transceiver;

at least one memory comprising instructions; and at least one processor configured to execute the instructions to cause the apparatus to:

receive, via the at least one transceiver, configuration information associated with one or more aircrafts, wherein the configuration information includes one or more parameters to be used for communication between the apparatus and the one or more aircrafts;

generate a message after receiving the configuration information; and transmit, to at least one aircraft of the one or more aircrafts via the at least one transceiver and using at least one parameter of the one or more parameters, the message, wherein the transmission is configured to cause data in the message to be relayed from the at least one aircraft to a terrestrial network entity.

2. The apparatus of claim 1, wherein the at least one processor is further configured to cause the apparatus to:

transmit, to a network entity via the at least one transceiver, one or more context parameters associated with the apparatus, wherein the one or more context parameters include at least one of global navigation satellite system (GNSS) data associated with the apparatus, route data associated with the apparatus, or destination data associated with the apparatus.

3. The apparatus of claim 2, wherein the at least one processor is further configured to cause the apparatus to:

select the at least one aircraft from the one or more aircrafts based on the configuration information and at least one of the one or more context parameters.

4. The apparatus of claim 1, wherein the configuration information includes at least one of resource information for a random-access channel (RACH) preamble, a RACH preamble format, an aircraft route, an aircraft flight time, a timing advance (TA) parameter, or an inactive radio network temporary identifier (I-RNTI) parameter.

5. The apparatus of claim 1, wherein the configuration information is received via a radio resource control (RRC) protocol message.

6. The apparatus of claim 1, wherein the configuration information is received via an application layer protocol message.

7. The apparatus of claim 1, wherein the at least one processor is further configured to cause the apparatus to:

receive, via the at least one transceiver from a network entity, a radio resource control (RRC) release message, wherein the RRC release message indicates that the apparatus is to enter an RRC inactive mode; and transition the apparatus from the RRC inactive mode to an RRC connected mode based on the configuration information.

8. The apparatus of claim 1, wherein the message includes at least one of a small data transmission (SDT), a random-access channel (RACH) preamble message, or a scheduled uplink transmission.

9. The apparatus of claim 1, wherein the at least one aircraft corresponds to at least one of a network entity or an integrated access and backhaul (IAB) node.

10. The apparatus of claim 1, wherein the apparatus is configured to operate as a user equipment (UE).

11. A method for wireless communications performed by a user equipment (UE), comprising:

receiving configuration information associated with one or more aircrafts, wherein the configuration information includes one or more parameters to be used for communication between the UE and the one or more aircrafts;

generating a message after receiving the configuration information; and transmitting, to at least one aircraft of the one or more aircrafts and using at least one parameter of the one or more parameters, the message, wherein the transmission is configured to cause data in the message to be relayed from the at least one aircraft to a terrestrial network entity.

12. The method of claim 11, further comprising:

transmitting, to a network entity, one or more UE context parameters associated with the UE, wherein the one or more UE context parameters include at least one of global navigation satellite system (GNSS) data associated with the UE, route data associated with the UE, or destination data associated with the UE.

13. The method of claim 12, further comprising:

selecting the at least one aircraft from the one or more aircrafts based on the configuration information and at least one of the one or more UE context parameters.

14. The method of claim 11, wherein the configuration information includes at least one of resource information for a random-access channel (RACH) preamble, a RACH preamble format, an aircraft route, an aircraft flight time, a timing advance (TA) parameter, or an inactive radio network temporary identifier (I-RNTI) parameter.

15. The method of claim 11, wherein the configuration information is received via a radio resource control (RRC) protocol message.

16. The method of claim 11, wherein the configuration information is received via an application layer protocol message.

17. The method of claim 11, further comprising:

receiving, from a network entity, a radio resource control (RRC) release message, wherein the RRC release message indicates that the UE is to enter an RRC inactive mode; and transitioning the UE from the RRC inactive mode to an RRC connected mode based on the configuration information.

18. The method of claim 11, wherein the message transmitted to the at least one aircraft includes at least one of a small data transmission (SDT), a random-access channel (RACH) preamble message, or a scheduled uplink transmission.

19. The method of claim 11, wherein the at least one aircraft corresponds to at least one of a network entity or an integrated access and backhaul (IAB) node.

20. An apparatus for wireless communications, comprising:

at least one transceiver;

at least one memory comprising instructions; and at least one processor configured to execute the instructions to cause the apparatus to:

receive, from a terrestrial user equipment (UE) via the at least one transceiver, at least one message, wherein the at least one message is based on configuration information associated with one or more aircrafts, and wherein the configuration information includes one or more parameters to be used for communication between the terrestrial UE and the one or more aircrafts; and transmit, to a terrestrial network entity via the at least one transceiver, data in the at least one message.

21. The apparatus of claim 20, wherein the at least one processor is further configured to cause the apparatus to:

receive, from a network entity via the at least one transceiver, one or more UE context parameters associated with the terrestrial UE, wherein the one or more UE context parameters include at least one of global navigation satellite system (GNSS) data associated with the terrestrial UE, route data associated with the terrestrial UE, or destination data associated with the terrestrial UE.

22. The apparatus of claim 20, wherein the apparatus and the terrestrial network entity are in a same Radio Access Network Based Notification Area (RNA).

23. The apparatus of claim 20, wherein the at least one processor is further configured to cause the apparatus to:

transmit, to a network entity via the at least one transceiver, configuration information associated with the apparatus, wherein the configuration information includes at least one of resource information for a random-access channel (RACH) preamble, a RACH preamble format, an aircraft route, an aircraft flight time, a timing advance (TA) parameter, or an inactive radio network temporary identifier (I-RNTI) parameter.

24. The apparatus of claim 20, wherein the at least one message from the terrestrial UE corresponds to an SOS message.

25. The apparatus of claim 20, wherein the at least one processor is further configured to cause the apparatus to:

receive, from the terrestrial UE via the at least one transceiver, at least one of a small data transmission (SDT), a random-access channel (RACH) preamble message, or a scheduled uplink transmission.

26. The apparatus of claim 20, wherein the apparatus is configured to operate as an aircraft.

27. A method for wireless communications performed by an aircraft, comprising:

receiving at least one message from a terrestrial user equipment (UE), wherein the at least one message is generated after the terrestrial UE receives configuration information associated with one or more aircrafts, and wherein the configuration information includes one or more parameters to be used for communication between the terrestrial UE and the one or more aircrafts; and transmitting, to a terrestrial network entity, data in the at least one message.

28. The method of claim 27, further comprising:

receiving, from a network entity, one or more UE context parameters associated with the terrestrial UE, wherein the one or more UE context parameters include at least one of global navigation satellite system (GNSS) data associated with the terrestrial UE, route data associated with the terrestrial UE, or destination data associated with the terrestrial UE.

29. The method of claim 27, wherein the aircraft and the terrestrial network entity are in a same Radio Access Network Based Notification Area (RNA).

30. The method of claim 27, further comprising:

transmitting, to a network entity, configuration information associated with the aircraft, wherein the configuration information includes at least one of resource information for a random-access channel (RACH) preamble, a RACH preamble format, an aircraft route, an aircraft flight time, a timing advance (TA) parameter, or an inactive radio network temporary identifier (I-RNTI) parameter.

* * * * *